United States Patent
Kwak et al.

(10) Patent No.: US 10,603,876 B2
(45) Date of Patent: Mar. 31, 2020

(54) FLEXIBLE DISPLAY APPARATUS

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Byeong Do Kwak, Suwon-si (KR); Sung Hyun Mun, Suwon-si (KR); Ik Hwan Cho, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 15/440,982

(22) Filed: Feb. 23, 2017

(65) Prior Publication Data
US 2017/0247579 A1 Aug. 31, 2017

(30) Foreign Application Priority Data

Feb. 25, 2016 (KR) ........................ 10-2016-0022876
Dec. 14, 2016 (KR) ........................ 10-2016-0170834

(51) Int. Cl.
*B32B 7/02* (2019.01)
*B32B 27/08* (2006.01)
(Continued)

(52) U.S. Cl.
CPC ................ *B32B 27/08* (2013.01); *B32B 7/12* (2013.01); *B32B 27/281* (2013.01);
(Continued)

(58) Field of Classification Search
CPC . B32B 7/02; B32B 7/12; B32B 27/308; C09J 133/06; C09J 133/062; C09J 133/064; C09J 133/08; C09J 133/10
See application file for complete search history.

(56) References Cited

U.S. PATENT DOCUMENTS

2013/0052457 A1 2/2013 Inui et al.
2014/0162044 A1* 6/2014 Lee ..................... C09J 133/066
428/220
(Continued)

FOREIGN PATENT DOCUMENTS

CN     1414843 A     4/2003
CN   101851402 A    10/2010
(Continued)

OTHER PUBLICATIONS

BASF Specialty Monomers Technical Data, accessed Sep. 27, 2017 from http://www.specialty-monomers.basf.com/portal/streamer?fid=235715 (Year: 2017).*
(Continued)

*Primary Examiner* — Prashant J Khatri
*Assistant Examiner* — Zachary M Davis
(74) *Attorney, Agent, or Firm* — Lewis Roca Rothgerber Christie LLP

(57) ABSTRACT

A flexible display apparatus includes a display unit, a first adhesive film on the display unit, an optical film on the first adhesive film, a second adhesive film on the optical film, and a window film on the second adhesive film, and the second adhesive film has a higher modulus than the first adhesive film at −20° C. to 25° C.

17 Claims, 3 Drawing Sheets

(51) Int. Cl.
*C08F 220/18* (2006.01)
*B32B 7/12* (2006.01)
*B32B 27/30* (2006.01)
*C08L 51/00* (2006.01)
*B32B 27/36* (2006.01)
*B32B 27/32* (2006.01)
*B32B 27/28* (2006.01)
*C09J 133/06* (2006.01)
*G02B 5/30* (2006.01)

(52) U.S. Cl.
CPC .......... *B32B 27/308* (2013.01); *B32B 27/325* (2013.01); *B32B 27/36* (2013.01); *B32B 27/365* (2013.01); *C08F 220/18* (2013.01); *C08L 51/00* (2013.01); *B32B 2250/24* (2013.01); *B32B 2255/10* (2013.01); *B32B 2255/26* (2013.01); *B32B 2307/412* (2013.01); *B32B 2307/42* (2013.01); *B32B 2307/50* (2013.01); *B32B 2307/732* (2013.01); *B32B 2457/20* (2013.01); *C09J 133/066* (2013.01); *C09J 2433/00* (2013.01); *C09J 2467/005* (2013.01); *G02B 5/3033* (2013.01)

(56) References Cited

U.S. PATENT DOCUMENTS

| | | | |
|---|---|---|---|
| 2016/0026022 A1 | 1/2016 | Jung et al. | |
| 2016/0122599 A1 | 5/2016 | Kim et al. | |
| 2016/0122600 A1 | 5/2016 | Moon et al. | |
| 2016/0297178 A1* | 10/2016 | Kang | B32B 27/06 |
| 2017/0015880 A1 | 1/2017 | Kim et al. | |
| 2017/0115780 A1* | 4/2017 | Ogikubo | C09J 201/00 |
| 2017/0162823 A1 | 6/2017 | Kim et al. | |
| 2017/0253769 A1 | 9/2017 | Cho et al. | |
| 2017/0306193 A1 | 10/2017 | Moon et al. | |
| 2017/0355173 A1* | 12/2017 | Tanaka | B32B 27/00 |

FOREIGN PATENT DOCUMENTS

| | | | |
|---|---|---|---|
| CN | 102812423 A | | 12/2012 |
| CN | 102952505 A | | 3/2013 |
| CN | 103865411 A | | 6/2014 |
| CN | 103897620 A | | 7/2014 |
| CN | 103897621 A | | 7/2014 |
| CN | 103969732 A | | 8/2014 |
| CN | 104097375 A | | 10/2014 |
| CN | 104183779 A | | 12/2014 |
| CN | 104220254 A | | 12/2014 |
| CN | 105278140 A | | 1/2016 |
| CN | 105283311 A | | 1/2016 |
| JP | 2007-176542 A | | 7/2007 |
| KR | 10-2008-0075779 A | | 8/2008 |
| KR | 20100002638 A | * | 1/2010 |
| KR | 10-2014-0076425 A | | 6/2014 |
| KR | 10-2015-0058066 A | | 5/2015 |
| KR | 10-1579710 B1 | | 12/2015 |
| TW | 201604756 A | | 2/2016 |
| WO | WO 2015/076567 A1 | | 5/2015 |

OTHER PUBLICATIONS

Thermal Transitions of Homopolymers: Glass Transition and Melting Point, Accessed Sep. 27, 2017 from https://www.sigmaaldrich.com/content/dam/sigma-aldrich/docs/Aldrich/General_Information/thermal_transitions_of_homopolymers.pdf (Year: 2017).*
Machine Translation of KR-2010-0002638 (Year: 2010).*
Utracki, Glass Transition Temperature of Polymer Blends, 1985, Advances in Polymer Techology, vol. 5, Issue 1, pp. 33-39 (Year: 1985).*
China Office Action dated Jan. 2, 2019 in corresponding Chinese Patent Application No. 201710101443.3 (6 pgs.).
U.S. Notice of Allowance dated Jul. 9, 2018, issued in U.S. Appl. No. 15/491,785 (9 pages).
Chinese Office Action dated Mar. 5, 2019, corresponding to Chinese Patent Application No. 2017102629543 (6 pgs.).
Korean Office Action dated Apr. 23, 2019, for corresponding Korean Patent Application No. 10-2016-0170834 (7 pages).

* cited by examiner

FLEXIBLE DISPLAY APPARATUS

CROSS-REFERENCE TO RELATED APPLICATIONS

This application claims priority to and the benefit of Korean Patent Application No. 10-2016-0022876, filed on Feb. 25, 2016 in the Korean Intellectual Property Office, and Korean Patent Application No. 10-2016-0170834, filed on Dec. 14, 2016 in the Korean Intellectual Property Office, the entire disclosures of both of which are incorporated herein by reference.

BACKGROUND

1. Field

Aspects of embodiments of the present invention relate to a flexible display apparatus.

2. Description of the Related Art

Recently, an optical display apparatus, such as a liquid crystal display, an organic light emitting diode display and the like, has been replaced by a glass substrate or a high hardness film. To this end, a flexible display apparatus capable of being folded and unfolded has been developed in the related art. Such a flexible display apparatus employs a film as a substrate and thus is not only thin and light, but also exhibits high impact resistance. In addition, the flexible display apparatus can be folded and unfolded and thus can be manufactured into various shapes.

The flexible display apparatus may include a display unit, an optical film, a window film, and the like. The flexible display apparatus has a structure in which various optical films and window films are stacked on the display unit. In particular, the display unit may also be manufactured in the form of a film, such as an optical film and a window film. The display unit, the optical film, and the window film may be adhered to optical clear adhesive (OCA) films, respectively. Thus, the OCA films must combine the display unit, the optical film and the window film, and the flexible display apparatus must be sufficiently folded while securing good reliability and/or durability.

The background technique is disclosed in Japanese Unexamined Patent Publication No. 2007-176542.

SUMMARY

In accordance with one or more embodiments of the present invention, a flexible display apparatus includes: a display unit; a first adhesive film formed on the display unit; an optical film formed on the first adhesive film; a second adhesive film formed on the optical film; and a window film formed on the second adhesive film, and the second adhesive film has a higher modulus than the first adhesive film at −20° C. to 25° C.

DETAILED DESCRIPTION

Figure 1:
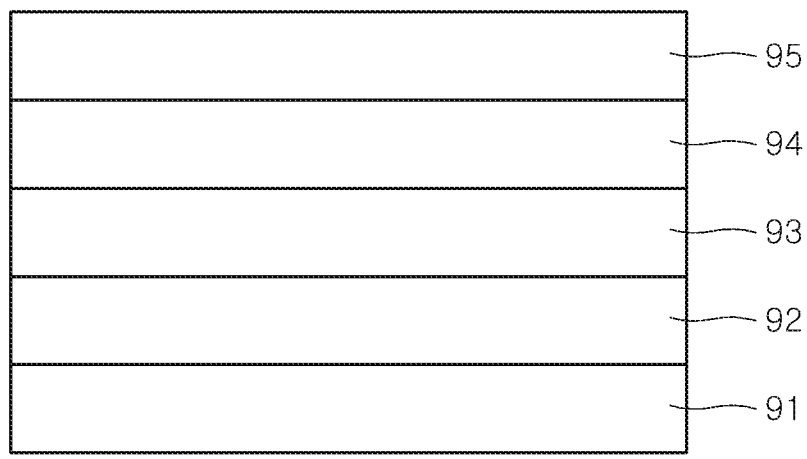
FIG. 1 is a sectional view of a flexible display apparatus according to an embodiment of the present invention.

Embodiments of the present invention will be described in further detail with reference to the accompanying drawings to provide a thorough understanding of the invention to those skilled in the art. It is to be understood that the present invention may be embodied in different ways and is not limited to the following embodiments. In the drawings, portions irrelevant to the description may be omitted for clarity. Like components are denoted by like reference numerals throughout the specification.

Herein, spatially relative terms such as "upper" and "lower" are defined with reference to the accompanying drawings. Thus, it is to be understood that "upper" can be used interchangeably with "lower." It is to be understood that when a layer is referred to as being "on" another layer, it can be directly formed on the other layer, or one or more intervening layers may also be present. Thus, it will be understood that when a layer is referred to as being "directly on" another layer, no intervening layer is interposed therebetween Herein, the term "(meth)acryl" refers to acryl and/or methacryl.

Herein, the term "copolymer" may include an oligomer, a polymer, or a resin.

Herein, the term "bubble generation area ratio" refers to a value (%) measured on a specimen corresponding to a display apparatus and obtained by sequentially stacking a polyethylene terephthalate (PET) film (thickness: 100 µm) and a first adhesive film (thickness: 50 µm) as a display unit, a PET film (thickness: 50 µm) as an optical film, a second adhesive film (thickness: 50 µm), and a PET film (thickness: 125 µm) as a window film. Specifically, the specimen was cut to a size of 160 mm×100 mm, bent towards the window film so as to be placed between parallel frames having a gap of about 1 cm therebetween, and was subjected to aging at 60° C. and 93% RH for about 24 hours, followed by analyzing an image, which was obtained by photographing a portion of the specimen suffering from bubble generation using an optical microscope (EX-51, Olympus Co., Ltd., magnification: 30), using Mac-View software (Mountech Co., Ltd.) in order to measure a ratio (%) of the total area occupied by bubbles to the area of the specimen.

Herein, the term "modulus" refers to storage modulus measured under auto strain conditions at a shear rate of 1 rad/sec and a strain of 1% using a dynamic viscoelasticity instrument ARES (MCR-501, Anton Paar Co., Ltd.). A specimen was obtained by stacking adhesive films (thickness: 50 µm) to a thickness of 500 µm and punching the stacked adhesive films using a punching machine having a diameter of 8 mm. In measurement, temperature was increased from −60° C. to 90° C. at a rate of 5° C./min and modulus was measured at −20° C., 25° C., and 80° C.

Figure 2A:
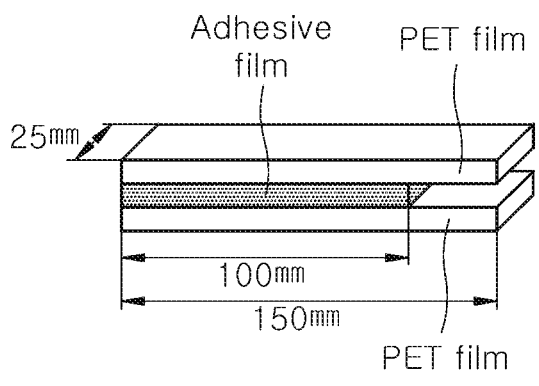
FIGS. 2A and 2B are conceptual diagrams showing a specimen for measuring peel strength.
Figure 2B:
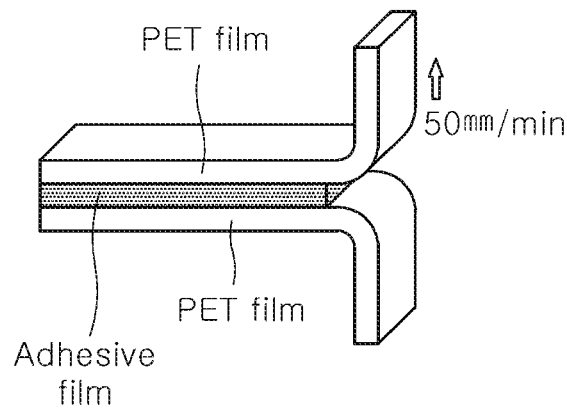

Herein, the term "peel strength" of an adhesive film refers to T-peel strength thereof. In order to measure peel strength of the adhesive film, polyethylene terephthalate (PET) films having a size of 150 mm×25 mm×75 µm (length×width×thickness) were subjected to corona treatment twice (total dose: 156) under corona discharge at a dose of 78 using a corona treatment device. The corona-treated surfaces of the PET films were laminated onto both surfaces of an adhesive film having a size of 100 mm×25 mm×50 µm (length×width×thickness), thereby preparing a specimen, as shown in FIG. 2A. The specimen was subjected to autoclaving at 3.5 bar and 50° C. for 1,000 seconds and secured to a TA.XT_Plus Texture Analyzer (Stable Micro System). Referring to FIG. 2B, with the specimen secured at one side thereof to the TA.XT_Plus Texture Analyzer, T-peel strength 25° C. was measured by pulling the other side of the PET film at 50 mm/min.

Herein, the term "average particle diameter of organic nanoparticles" refers to a z-average particle diameter of the nanoparticles, as measured in a water-based or organic solvent using a Zetasizer nano-ZS (Malvern Co., Ltd.).

Herein, the term "core-shell structure" may mean a typical core-shell structure. In addition, each of the core and the shell may be composed of a single layer or multiple layers, and the term "outermost layer" refers to the outermost layer among several layers.

Herein, a flexible display apparatus according to an embodiment of the present invention will be described with reference to FIG. 1. FIG. 1 is a sectional view of a flexible display apparatus according to an embodiment of the present invention.

Referring to FIG. 1, a flexible display apparatus 100 according to an embodiment includes a display unit 91, a first adhesive film 92 formed on the display unit 91, an optical film 93 formed on the first adhesive film 92, a second adhesive film 94 formed on the first adhesive film 93, and a window film 95 formed on the second adhesive film 94.

Herein, the first adhesive film 92 and the second adhesive film 94 will be described in more detail.

The first adhesive film 92 may be interposed between the display unit 91 and the optical film 93 to adhere the display unit 91 to the optical film 93. The second adhesive film 94 may be interposed between the optical film 93 and the window film 95 to adhere the optical film 93 to the window film 95.

In an embodiment, the second adhesive film 94 has a higher modulus than the first adhesive film 92. The second adhesive film 94 is required to have high modulus so as not to contain external moisture or air and to exhibit excellent preservation and restoration even after application of external strength thereto. On the other hand, if the first adhesive film 92 has the same modulus as the second adhesive film 94, the flexible display apparatus exhibits poor foldability, which can lead to failure of the display unit 91 upon folding. Thus, the first adhesive film 92 has a lower modulus than the second adhesive film 94 and has good reliability and durability at high temperature and/or high humidity. Thus, the flexible display apparatus 100 according to an embodiment can exhibit excellent foldability not only at room temperature, but also at low temperature, and can exhibit good reliability and durability at high temperature and/or high humidity without bubble generation, cracking, and slight lifting. In an embodiment, a modulus ratio (i.e. modulus of the second adhesive film 94/modulus of the first adhesive film 92) at −20° C. to 25° C. may be greater than about 1.0 to about 10, and, in one embodiment, about 1.1 to about 10, and, in one embodiment, about 1.1 to about 5, for example, about 1.1, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, or about 10. Within this range, the adhesive films can exhibit good foldability and good reliability and durability under high temperature/humidity conditions, and the window film and/or the display unit can be sufficiently connected to each other and allow repeated folding even when provided in film form. A modulus ratio (i.e. modulus of the second adhesive film 94/modulus of the first adhesive film 92) at 80° C. may be about 1.0 or more, and, in one embodiment, about 1.1 to about 5, for example, about 1.1, about 1.5, about 2.0, about 2.5, about 3.0, about 3.5, about 4.0, about 4.5, or about 5.0. Herein, assuming that the temperature is X° C. when the "modulus" or the "modulus ratio" is referred to, X° C. may mean not only X° C. but also (X−5°) C. to (X+5°) C.

The first adhesive film 92 may have a modulus at −20° C. of about 150 kPa or less, and, in one embodiment, about 60 kPa to about 100 kPa, for example, about 60 kPa, about 65 kPa, about 70 kPa, about 75 kPa, about 80 kPa, about 85 kPa, about 90 kPa, about 95 kPa, about 100 kPa, about 105 kPa, about 110 kPa, about 115 kPa, about 120 kPa, about 125 kPa, about 130 kPa, about 135 kPa, about 140 kPa, about 145 kPa, or about 150 kPa. Within this range, regardless of the second adhesive film 94, the flexible display apparatus 100 can be folded well even at low temperature, and the window film 95 and/or the display unit 91 can be sufficiently connected to each other and allow repeated folding even when provided in film form.

The second adhesive film 94 may have a modulus at 80° C. of about 25 kPa or more, and, in one embodiment, about 25 kPa to about 50 kPa, and, in one embodiment, about 28 kPa to about 40 kPa, for example, about 25 kPa, about 26 kPa, about 27 kPa, about 28 kPa, about 29 kPa, about 30 kPa, about 31 kPa, about 32 kPa, about 33 kPa, about 34 kPa, about 35 kPa, about 36 kPa, about 37 kPa, about 38 kPa, about 39 kPa, about 40 kPa, about 41 kPa, about 42 kPa, about 43 kPa, about 44 kPa, about 45 kPa, about 46 kPa, about 47 kPa, about 48 kPa, about 49 kPa, or about 50 kPa. Within this range, regardless of the first adhesive film 92, the second adhesive film 94 does not suffer from bubble generation, cracking and/or slight lifting under high temperature/humidity conditions to provide good reliability and durability under high temperature/humidity conditions, and can exhibit good restoration. In addition, the window film 95 and/or the display unit 91 can be sufficiently connected to each other and allow repeated folding even when provided in film form.

The flexible display apparatus 100 according to an embodiment may have a bubble generation area ratio of about 5% or less, and, in one embodiment, about 0% to about 3%, and, in one embodiment, about 0% to about 1%. Within this range, the flexible display apparatus 100 can secure reliability and durability.

Each of the first adhesive film 92 and the second adhesive film 94 may have a peel strength at 25° C. of about 800 gf/in or more, and, in one embodiment, about 1,100 gf/in to about 2500 gf/in, for example, about 800 gf/in, about 900 gf/in, about 1,000 gf/in, about 1,200 gf/in, about 1,300 gf/in, about 1,400 gf/in, about 1,500 gf/in, about 1,600 gf/in, about 1,700 gf/in, about 1,800 gf/in, about 1,900 gf/in, about 2,000 gf/in, about 2,100 gf/in, about 2,200 gf/in, about 2,300 gf/in, about 2,400 gf/in, or about 2,500 gf/in. Within this range, the display unit 91, the optical film 93 and the window film 95 are efficiently connected to one another, thereby improving reliability of the flexible display apparatus 100. In an embodiment, each of the first adhesive film 92 and the second adhesive film 94 has a thickness of 50 µm and a haze of about 5% or less in the visible region (for example: 300 nm to 800 nm), and, in one embodiment, about 3% or less, and, in one embodiment, about 1.5% or less. Within this range, the adhesive films can increase transparency of displays when used in the displays.

Each of the first adhesive film 92 and the second adhesive film 94 may have a thickness of about 1 µm to about 2 mm, and, in one embodiment, about 20 µm to about 1 mm, and, in one embodiment, about 50 µm to about 100 µm. Within this range, the adhesive film can be used in an optical display apparatus.

Each of the first adhesive film 92 and the second adhesive film 94 may include a cured product of an adhesive composition. Herein, an adhesive composition for the first adhesive film 92 and the second adhesive film 94 according to an embodiment of the invention (hereinafter, "adhesive composition") will be described.

The adhesive composition may include a monomer mixture for a hydroxyl group-containing (meth)acrylic copolymer, and organic nanoparticles.

The monomer mixture may form a hydroxyl group-containing (meth)acrylic copolymer. The hydroxyl group-containing (meth)acrylic copolymer forms a matrix of the adhesive film and can provide adhesive properties to the adhesive film. The hydroxyl group-containing (meth)acrylic copolymer may have a glass transition temperature of about −150° C. to about −13° C., and, in one embodiment, about −100° C. to about −20° C. Within this range, the adhesive film can exhibit good foldability and good adhesive strength and reliability in a wide temperature range.

The monomer mixture may include a hydroxyl group-containing (meth)acrylate and a comonomer. The "comonomer" is different from the hydroxyl group-containing (meth)acrylate.

The hydroxyl group-containing (meth)acrylate may include at least one selected from among a (meth)acrylic acid ester containing a $C_1$ to $C_{20}$ alkyl group having at least one hydroxyl group, a (meth)acrylic acid ester containing a $C_5$ to $C_{20}$ cycloalkyl group having at least one hydroxyl group, and a (meth)acrylic acid ester containing a $C_6$ to $C_{20}$ aryl group having at least one hydroxyl group. In an embodiment, the hydroxyl group-containing (meth)acrylate may include at least one selected from among 2-hydroxyethyl (meth)acrylate, 4-hydroxybutyl (meth)acrylate, 2-hydroxypropyl (meth)acrylate, 2-hydroxybutyl (meth)acrylate, and 6-hydroxyhexyl (meth)acrylate, without being limited thereto. Particularly, a (meth)acrylic monomer containing a $C_1$ to $C_5$ alkyl group having a hydroxyl group can further improve adhesion of the adhesive film. The hydroxyl group-containing (meth)acrylic monomer may be present in an amount of about 5% by weight (wt %) to about 40 wt %, for example, about 10 wt % to about 35 wt %, for example, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, or about 40 wt %, in the monomer mixture. Within this range, the adhesive film has low haze and can exhibit good bonding strength.

The comonomer may include at least one of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and a silane group-containing monomer, without being limited thereto.

The alkyl (meth)acrylate monomer may include an unsubstituted $C_1$ to $C_{20}$ linear or branched alkyl (meth)acrylic ester. For example, the alkyl (meth)acrylate monomer may include at least one selected from among methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, and lauryl (meth)acrylate. In an embodiment, a $C_4$ to $C_8$, particularly, branched, alkyl (meth)acrylic acid ester is used to improve initial adhesive strength of the adhesive film.

The ethylene oxide-containing monomer is a (meth)acrylate monomer containing an ethylene oxide group (—CH$_2$CH$_2$O—), and may include polyethylene oxide alkyl ether (meth)acrylates, such as polyethylene oxide monomethyl ether (meth)acrylate, polyethylene oxide monomethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and polyethylene oxide mono-tert-butyl ether (meth)acrylate, without being limited thereto.

The propylene oxide-containing monomer is a (meth)acrylate monomer containing a propylene oxide group (—CH$_2$CH$_2$CH$_2$O— or —CH$_2$CHCH$_3$O—), and may include polypropylene oxide alkyl ether (meth)acrylates, such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, and polypropylene oxide mono-tert-butyl ether (meth)acrylate, without being limited thereto.

The amine group-containing monomer may include any of amine group-containing (meth)acrylic monomers, such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and methacryloxyethyltrimethyl ammonium chloride (meth)acrylate, without being limited thereto.

The amide group-containing monomer may include any of amide group-containing (meth)acrylic monomers such as (meth)acrylamide, N-methyl (meth)acrylamide, N-methylol (meth)acrylamide, N-methoxymethyl (meth)acrylamide, N,N-methylene bis(meth)acrylamide, and N-2-hydroxyethyl (meth)acrylamide, without being limited thereto.

The alkoxy group-containing monomer may include any of alkoxy group-containing (meth)acrylic monomers, such as 2-methoxyethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and 3-butoxyhexyl (meth)acrylate, without being limited thereto.

The phosphoric acid group-containing monomer may include any of phosphoric acid-containing (meth)acrylic monomers, such as 2-(meth)acryloyloxyethyldiphenylphosphate (meth)acrylate, tri(meth)acryloyloxyethylphosphate (meth)acrylate, and triacryloyloxyethylphosphate (meth)acrylate, without being limited thereto.

The sulfonic acid group-containing monomer may include any of sulfonic acid group-containing acrylic monomers, such as sodium sulfopropyl(meth)acrylate, sodium 2-sulfoethyl (meth)acrylate, and sodium 2-acrylamido-2-methylpropane sulfonate, without being limited thereto.

The phenyl group-containing monomer may include any of phenyl group-containing (meth)acrylic monomers, such as p-tert-butylphenyl (meth)acrylate and o-biphenyl(meth)acrylate, without being limited thereto.

The silane group-containing monomer may include any of silane group-containing vinyl monomers, such as 2-acetoacetoxyethyl (meth)acrylate, vinyltrimethoxysilane, vinyltriethoxysilane, vinyl tris(β-methoxyethyl)silane, vinyltriacetylsilane, and methacryloyloxypropyltrimethoxysilane, without being limited thereto.

The comonomer may be present in an amount of about 60 wt % to about 95 wt %, and, in one embodiment, about 65 wt % to about 90 wt %, for example, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, or about 95 wt %, in the monomer mixture. Within this range, the adhesive film can exhibit good bonding strength and reliability.

In an embodiment, the monomer mixture may include the hydroxyl group-containing (meth)acrylate and a comonomer, a homopolymer of which has a glass transition temperature of about −150° C. to about 0° C. Herein, the "glass transition temperature" may be measured with respect to a homopolymer of each measurement target monomer using a DSC Q20 (TA Instrument Inc.). Specifically, a homopolymer of each monomer is heated to about 160° C. at a rate of about 20° C./min, slowly cooled and maintained in an equilibrium state at about 50° C., and heated to about 160° C. at a rate of 10° C./min in order to obtain data of an endothermic transition curve. An inflection point of the endothermic transition curve is determined as the glass transition temperature. The comonomer, a homopolymer of which has a glass transition temperature of about −150° C. to about 0° C., may include a comonomer, a homopolymer of which has a glass transition temperature of about −150° C. to about −20° C., and, in one embodiment, about −150° C. to about −40° C. Within this range, the adhesive film can exhibit good foldability at low temperature. The comonomer may include at least one selected from among, for example, alkyl (meth)acrylate monomers including methyl acrylate, ethyl acrylate, isopropyl acrylate, n-butyl acrylate, iso-butyl acrylate, hexyl (meth)acrylate, heptyl (meth)acrylate, 2-ethylhexyl acrylate, dodecyl (meth)acrylate, and the like; alkylene oxide-containing (meth)acrylate monomers including polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, and the like; amino group-containing (meth)acrylate monomers including monomethylaminoethyl (meth)acrylate, monoethylaminoethyl (meth)acrylate, monomethylaminopropyl (meth)acrylate, monoethylaminopropyl (meth)acrylate, and the like; alkoxy group-containing (meth)acrylate monomers including 2-methoxy ethyl (meth)acrylate, 2-methoxypropyl (meth)acrylate, 2-ethoxypropyl (meth)acrylate, and the like; and silane group-containing (meth)acrylate monomers including 2-acetoacetoxyethyl (meth)acrylate, vinyltrimethoxysilane, vinyltriethoxysilane, and the like.

The monomer mixture may further include a carboxyl group-containing monomer. The carboxyl group-containing monomer may include any of (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and maleic anhydride, without being limited thereto. The carboxyl group-containing monomer may be present in an amount of about 10 wt % or less, specifically about 7 wt % or less, more specifically about 5 wt % or less, in the monomer mixture. Within this range, the adhesive film can exhibit good bonding strength and reliability.

The monomer mixture may further include an alicyclic group-containing (meth)acrylate. The alicyclic group-containing (meth)acrylate is a $C_5$ to $C_{20}$ cycloalkyl (meth)acrylate monomer and may include any of isobornyl (meth)acrylate, bonyl (meth)acrylate, and cyclohexyl(meth)acrylate, without being limited thereto. These may be used alone or as a mixture thereof. The alicyclic group-containing (meth)acrylate may be present in an amount of about 0.01 wt % to about 5 wt %, for example, about 0.5 wt % to about 3 wt %, and, in one embodiment, about 1 wt % to about 3 wt %, in the monomer mixture. Within this range, the adhesive film does not suffer from slight lifting under heat/moisture test conditions and exhibits good durability.

The organic nanoparticles provide good viscoelasticity at low temperature and/or room temperature and have a cross-linked structure, thereby realizing stable high temperature/humidity viscoelasticity of the adhesive film. In one or more embodiments, the nanoparticles can form a chemical bond with the hydroxyl group-containing (meth)acrylic copolymer.

Although the adhesive composition or the adhesive film includes the organic nanoparticles, there is a difference in index of refraction between the organic nanoparticles having a specific average particle size and the hydroxyl group-containing (meth)acrylic copolymer, thereby securing good transparency of the adhesive film. The organic nanoparticles may have an average particle diameter of about 10 nm to about 400 nm, and, in one embodiment, about 10 nm to about 300 nm, and, in one embodiment, about 10 nm to about 200 nm, for example, about 10 nm, about 20 nm, about 30 nm, about 40 nm, about 50 nm, about 60 nm, about 70 nm, about 80 nm, about 90 nm, about 100 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, about 280 nm, about 290 nm, or about 300 nm. Within this range, agglomeration of the organic nanoparticles can be prevented or substantially prevented and the adhesive film exhibits good transparency. A difference in index of refraction between the organic nanoparticles and the hydroxyl group-containing (meth)acrylic copolymer may be about 0.05 or less, and, in one embodiment, about 0 to about 0.03, and, in one embodiment, about 0 to about 0.02. Within this range, the adhesive film can exhibit good transparency.

The organic nanoparticles may have a core-shell structure, in which the core and the shell may have glass transition temperatures satisfying Equation 1:

$$Tg(c) < Tg(s)$$ [Equation 1]

wherein Tg (c) is the glass transition temperature (unit: ° C.) of the core and Tg (s) is the glass transition temperature (unit: ° C.) of the shell.

In an embodiment, the core may have a glass transition temperature of about −150° C. to about 10° C., and, in one embodiment, about −150° C. to about −5° C., and, in one embodiment, about −150° C. to about −20° C. Within this range, the adhesive film can realize storage modulus required at low temperature (−20° C.) and exhibits good viscoelasticity at low temperature and/or room temperature. The core may include at least one polyalkyl (meth)acrylate having a glass transition temperature within the above range. For example, the core may include at least one of polymethyl acrylate, polyethyl acrylate, polypropyl acrylate, polybutyl acrylate, polyisopropyl acrylate, polyhexyl acrylate, polyhexyl methacrylate, polyethylhexyl acrylate and polyethylhexyl methacrylate, without being limited thereto. Preferably, the core includes at least one of polybutyl acrylate and polyethylhexyl acrylate.

In an embodiment, the shell has a glass transition temperature of about 15° C. to about 150° C., and, in one embodiment, about 35° C. to about 150° C., and, in one embodiment, about 50° C. to about 140° C. Within this range, the organic nanoparticles exhibit good dispersion in the hydroxyl group-containing (meth)acrylic copolymer. The shell may include a polyalkyl (meth)acrylate having a glass transition temperature within this range. For example, the shell may include at least one of polymethyl methacrylate (PMMA), polyethyl methacrylate, polypropyl methacrylate, polybutyl methacrylate, polyisopropyl methacrylate, polyisobutyl methacrylate, and polycyclohexyl methacrylate, without being limited thereto. Preferably, the shell includes polymethyl methacrylate.

The core or the shell may include two or more layers, and an outermost layer of the nanoparticles may include at least one polyalkyl (meth)acrylate having a glass transition temperature of about 15° C. to about 150° C. In an embodiment, the core may include at least one polyalkyl (meth)acrylate having a glass transition temperature of about −150° C. to about 10° C., or may include at least one polyalkyl (meth)acrylate without being limited by the glass transition temperature so long as the entire core has a glass transition temperature of about −150° C. to about 10° C., without being limited thereto. In addition, the shell may include at least one polyalkyl (meth)acrylate having a glass transition temperature of about 15° C. to about 150° C., or may at least one polyalkyl (meth)acrylate without being limited by the glass transition temperature so long as the entire shell has a glass transition temperature of about 15° C. to about 150° C., without being limited thereto.

The shell may be present in an amount of about 1 wt % to about 70 wt %, and, in one embodiment, about 5 wt % to about 60 wt %, and, in one embodiment, about 10 wt % to about 50 wt %, for example, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt %, in the organic nanoparticles. The core may be present in an amount of about 30 wt % to about 99 wt %, and, in one embodiment, about 40 wt % to about 95 wt %, and, in one embodiment, about 50 wt % to about 90 wt %, for example, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, or about 90 wt %, in the organic nanoparticles. Within these content ranges of the shell and the core, the adhesive film can maintain viscoelasticity in a wide temperature range and exhibit good recovery rate.

Relative to 100 parts by weight of the monomer mixture, the organic nanoparticles may be present in an amount of about 0.5 parts by weight to about 15 parts by weight, and, in one embodiment, about 0.5 parts by weight to about 10 parts by weight, and, in one embodiment, about 0.5 parts by weight to about 8 parts by weight, for example, about 0.5 parts by weight, about 1 part by weight, about 1.5 parts by weight, about 2 parts by weight, about 2.5 parts by weight, about 3 parts by weight, about 3.5 parts by weight, about 4 parts by weight, about 4.5 parts by weight, about 5 parts by weight, about 5.5 parts by weight, about 6 parts by weight, about 6.5 parts by weight, about 7 parts by weight, about 7.5 parts by weight, about 8 parts by weight, about 8.5 parts by weight, about 9 parts by weight, about 9.5 parts by weight, about 10 parts by weight, about 10.5 parts by weight, about 11 parts by weight, about 11.5 parts by weight, about 12 parts by weight, about 12.5 parts by weight, about 13 parts by weight, about 13.5 parts by weight, about 14 parts by weight, about 14.5 parts by weight, or about 15 parts by weight. Within this range, the adhesive film has balance between viscoelasticity, modulus, and recovery rate.

In an embodiment, the organic nanoparticles may be included in a state of being polymerized with the monomer mixture in preparation of the hydroxyl group-containing (meth)acrylic copolymer. In an embodiment, the organic nanoparticles may be included in the hydroxyl group-containing (meth)acrylic copolymer. In another embodiment, the adhesive composition may include organic nanoparticles together with a prepared hydroxyl group-containing (meth)acrylic copolymer. In this case, the organic nanoparticles may be included in the adhesive composition separately from the hydroxyl group-containing (meth)acrylic copolymer.

The adhesive composition may further include an initiator. The initiator may be a radical photopolymerization initiator or a heat polymerization initiator, which is the same as or different from the initiator used in preparation of the hydroxyl group-containing (meth)acrylic copolymer. The photopolymerization initiator may include any initiator so long as the initiator can realize a second crosslinking structure by deriving polymerization of the radical polymerizable compound during curing through light irradiation. For example, the photopolymerization initiator may include any of benzoin, acetophenone, hydroxy ketone, amino ketone, phosphine oxide photoinitiators, and the like. In an embodiment, the photopolymerization initiator may include any of benzoin, benzoin methyl ether, benzoin ethyl ether, benzoin isopropyl ether, benzoin n-butyl ether, benzoin isobutyl ether, acetophenone compounds, such as dimethylamino acetophenone, 2,2-dimethoxy-2-phenylacetophenone, and 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof. The heat polymerization initiator may include any initiator so long as the initiator can realize a second crosslinking structure by deriving polymerization of the heat polymerizable compound. For example, the heat polymerization initiator may include any typical initiator, for example, azo, peroxide and redox compounds. Examples of the azo compound may include 2,2-azobis(2-methylbutyronitrile), 2,2-azobis(isobutyronitrile), 2,2-azobis(2,4-dimethylvaleronitrile), 2,2-azobis-2-hydroxymethylpropionitrile, dimethyl-2,2-methylazobis(2-methylpropionate), and 2,2-azobis(4-methoxy-2,4-dimethylvaleronitrile). Examples of the peroxide compound may include: inorganic peroxides, such as potassium perchlorate, ammonium persulfate, and hydrogen peroxide; and organic peroxides, such as diacylperoxide, peroxydicarbonate, peroxyester, tetramethylbutylperoxy neodecanoate, bis(4-butylcyclohexyl)peroxydicarbonate, di(2-ethylhexyl)peroxy carbonate, butylperoxy neodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutylperoxy neodecanoate, amylperoxy neodecanoate, t-butylperoxy neoheptanoate, amylperoxy pivalate, t-butyl peroxypivalate, t-amyl peroxy-2-ethylhexanoate, lauroyl peroxide, dilauroyl peroxide, di(dodecanoyl) peroxide, benzoyl peroxide, and dibenzoyl peroxide, without being limited thereto. Examples of the redox compound may include mixtures of a peroxide compound and a reductant, without being limited thereto. The initiator may be present in an amount of about 0.01 parts by weight to about 5 parts by weight, and, in one embodiment, about 0.05 parts by weight to about 3 parts by weight, and, in one embodiment, about 0.1 parts by weight to about 1 part by weight, relative to 100 parts by weight of the monomer mixture. Within this range, the initiator allows complete curing of the adhesive composition and can prevent or substantially prevent deterioration in transmittance of the adhesive composition due to residual initiator.

The adhesive composition may further include a crosslinking agent. The crosslinking agent is a polyfunctional (meth)acrylate and, in an embodiment, may include: bifunctional acrylates, such as 1,4-butanediol di(meth)acrylate, 1,6-hexanediol di(meth)acrylate, neopentylglycol di(meth) acrylate, polyethyleneglycol di(meth)acrylate, neopentyl- glycol adipate di(meth)acrylate, dicyclopentanyl di(meth) acrylate, caprolactone-modified dicyclopentenyl di(meth) acrylate, ethylene oxide-modified di(meth)acrylate, di(meth)acryloxyethyl isocyanurate, allylated cyclohexyl di(meth)acrylate, tricyclodecanedimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, and 9,9-bis[4-(2-acryloyloxyethoxy)phenyl]fluorine; trimethylolpropane tri(meth)acrylate, dipentaerythritol tri(meth)acrylate, propionic acid-modified dipentaerythritol tri(meth)acrylate, pentaerythritol tri(meth) acrylate, and propylene oxide-modified trimethylolpropane tri(meth)acrylate, trifunctional urethane (meth)acrylates, and tris(meth)acryloxyethylisocyanurate; tetrafunctional acrylates, such as diglycerin tetra(meth)acrylate and pentaerythritol tetra(meth)acrylate; pentafunctional acrylates, such as dipentaerythritol penta(meth)acrylate; and hexafunctional acrylates, such as dipentaerythritol hexa(meth) acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto. These crosslinking agents may be used alone or in combination thereof. In an embodiment, the crosslinking agent may be a polyfunctional (meth)acrylate of a polyhydric alcohol containing 2 to 20 hydroxyl groups to provide good durability. The crosslinking agent may be present in an amount of about 10 parts by weight or less, and, in one embodiment, about 0.01 parts by weight to about 7 parts by weight, and, in one embodiment, about 0.01 parts by weight to about 5 parts by weight, relative to 100 parts by weight of the monomer mixture. Within this range, the adhesive film can exhibit good adhesion and reliability.

The adhesive composition may further include a silane coupling agent. The silane coupling agent may include any of siloxane and epoxy silane coupling agents, without being limited thereto. The silane coupling agent may be present in an amount of about 0.01 parts by weight to about 0.1 parts by weight, and, in one embodiment, about 0.05 parts by weight to about 0.1 parts by weight, relative to 100 parts by weight of the monomer mixture. Within this range, the adhesive film has improved reliability.

Optionally, the adhesive composition may further include typical additives, such as curing accelerators, ionic liquids, lithium salts, inorganic fillers, softeners, molecular weight regulators, antioxidants, anti-aging agents, stabilizers, adhesion-imparting resins, reforming resins (e.g., polyol, phenol, acrylic, polyester, polyolefin, epoxy, epoxidized polybutadiene resins, and the like), leveling agents, defoamers, plasticizers, dyes, pigments (e.g., coloring pigments, extender pigments, and the like), treatment agents, UV blocking agents, fluorescent whitening agents, dispersants, heat stabilizers, photostabilizers, UV absorbers, antistatic agents, coagulants, lubricants, solvents, and the like.

The adhesive composition may have a viscosity at 25° C. of about 300 cPs to about 50,000 cPs. Within this range, the adhesive composition can have good coatability and thickness uniformity.

Each of the first adhesive film 92 and the second adhesive film 94 may be formed of the adhesive composition including the hydroxyl group-containing (meth)acrylic copolymer and the organic nanoparticles. In an embodiment, to form the second adhesive film 94 having a higher modulus at −20° C. to 25° C. than the first adhesive film 92, the adhesive composition for the second adhesive film 94 may have a higher amount of the hydroxyl group-containing (meth) acrylic copolymer in the monomer mixture than the adhesive composition for the first adhesive film 92. In another embodiment, to form the second adhesive film 94 having a higher modulus than the first adhesive film 92, the adhesive composition for the second adhesive film 94 may further include a higher amount of the initiator or a higher amount of the crosslinking agent than the adhesive composition for the first adhesive film 92.

Next, a method of preparing the adhesive composition will be described.

The adhesive composition may be prepared by mixing an initiator with a monomer mixture for a hydroxyl group-containing (meth)acrylic copolymer to polymerize the monomer mixture, followed by adding organic nanoparticles, and, optionally, an initiator, a crosslinking agent, a silane coupling agent, and various additives to the polymerized monomer mixture. Alternatively, the adhesive composition may be prepared by preparing a prepolymer through partial polymerization of the monomer mixture for the hydroxyl group-containing (meth)acrylic copolymer, followed by adding the organic nanoparticles to the prepolymer. Alternatively, the adhesive composition may be prepared by adding the organic nanoparticles to the monomer mixture for the hydroxyl group-containing (meth)acrylic copolymer, followed by partial polymerization or complete polymerization. The polymerization may include solution polymerization, suspension polymerization, photopolymerization, bulk polymerization, dispersion polymerization, or emulsion polymerization. In an embodiment, emulsion polymerization may be performed at about 50° C. to about 100° C. by adding the initiator to the monomer mixture and the organic nanoparticles in a liquid phase initiator. The initiator may include a radical photopolymerization initiator, and, in one embodiment, a radical photopolymerization initiator including at least one of azobisisobutyronitrile, potassium persulfate, tert-butylhydroperoxide and diisopropylbenzene hydroperoxide, without being limited thereto. Partial polymerization may include polymerization to have a viscosity at 25° C. of about 100 cPs or more, and, in one embodiment, about 1,000 cPs to about 20,000 cPs after polymerization.

Next, a method of forming the adhesive film will be described.

Each of the first adhesive film and the second adhesive film may be prepared by applying the adhesive composition to a release film, for example, a polyethylene terephthalate (PET) film to a thickness (e.g., a predetermined thickness), followed by drying and curing. In an embodiment, the adhesive composition may be applied to the PET film subjected to surface treatment. For example, the PET film may be subjected to surface treatment through corona pretreatment at about 250 mJ/cm$^2$ or more to increase peel strength of the first adhesive film and the second adhesive film, specifically peel strength at about 25° C. and about 60° C. Corona pretreatment may be performed using, for example, a corona processor (Now plasma) to treat the PET film twice while discharging plasma at about 78 doses, without being limited thereto.

Next, the display unit 91 will be described.

The display unit 91 serves to drive the flexible display apparatus 100, and may include a substrate and an optical device including organic light emitting diode (OLED), light emitting diode (LED), or liquid crystal display (LCD) elements formed on the substrate.

In an embodiment, the display unit 91 may include a lower substrate, thin film transistors, organic light emitting diodes, a planarization layer, a protective layer, and an insulation layer. The lower substrate supports the display unit 91 and may be formed with the thin film transistors and the organic light emitting diodes. The lower substrate may also be provided with a flexible printed circuit board (FPCB) for driving a touchscreen panel. The flexible printed circuit board may be further provided with a timing controller for driving an array of organic light emitting diodes, a power supply, and the like.

The lower substrate may include a substrate formed of a flexible resin. In an embodiment, the lower substrate may include a flexible substrate such as any of a silicon substrate, a polyimide substrate, a polycarbonate substrate, and a polyacrylate substrate, without being limited thereto.

In a display area of the lower substrate, plural pixel domains are defined by plural driving wires (not shown) and plural sensor wires (not shown) intersecting each other, and each of the pixel domains may be formed with an array of organic light emitting diodes, each of which includes a thin film transistor and an organic light emitting diode connected to the thin film transistor. In a non-display area of the lower substrate, a gate driver applying electric signals to the driving wires may be formed in the form of a gate-in panel. The gate-in panel unit is formed on one or both sides of the display area.

The thin film transistor controls electric current flowing through a semiconductor by application of an electric field perpendicular to the electric current and may be formed on the lower substrate. The thin film transistor may include a gate electrode, a gate insulation layer, a semiconductor layer, a source electrode, and a drain electrode. The thin film transistor may be an oxide thin film transistor which uses an oxide such as indium gallium zinc oxide (IGZO), ZnO, or TiO as the semiconductor layer, an organic thin film transistor which uses an organic material as the semiconductor layer, an amorphous silicon thin film transistor which uses amorphous silicon as the semiconductor layer, or a polycrystalline silicon thin film transistor which uses polycrystalline silicon as the semiconductor layer.

The planarization layer covers the thin film transistor and a circuit section to flatten upper surfaces of the thin film transistor and the circuit section such that the organic light emitting diode can be formed thereon. The planarization layer may be formed of a spin-on-glass (SOG) film, a polyimide polymer, or a polyacrylic polymer, without being limited thereto.

The organic light emitting diode realizes a display through self-emission, and may include a first electrode, an organic light-emitting layer, and a second electrode, which are stacked in the stated order. Adjacent organic light emitting diodes may be isolated from each other by the insulation layer. The organic light emitting diode may have a bottom emission type structure wherein light generated from the organic light-emitting layer is emitted through the lower substrate, or a top-emission type structure wherein light from the organic light-emitting layer is emitted through the upper substrate The protective layer covers the organic light emitting diodes to protect the organic light emitting diodes. The protective layer may be formed of an inorganic insulation material, such as SiOx, SiNx, SiC, SiON, SiONC, and amorphous carbon (a-C), or an organic insulation material, such as (meth)acrylates, epoxy polymers, imide polymers, and the like. In an embodiment, the protective layer may include an encapsulation layer in which an inorganic material layer and an organic material layer are sequentially stacked once or plural times.

Next, the optical film 93 will be described.

The optical film 93 may be an optical device interposed between the first adhesive film 92 and the second adhesive film 94 to provide a predetermined function to the flexible display apparatus 100.

Although the optical film 93 is illustrated as being composed of a single layer in FIG. 1, the optical film 93 may be a stack of a plurality of optical elements having the same function or a plurality of optical elements having different functions. In the structure of the optical film composed of the stack of the plurality of optical elements, the first adhesive film and the second adhesive film described above, or typical optically clear adhesive (OCA) films may be used. In an embodiment, the optical film 93 may include at least one of a polarizing plate and a touchscreen panel. The polarizing plate can realize polarization of internal light or prevent or substantially prevent reflection of external light to realize a display, or can increase contrast of the display. The polarizing plate may be composed of a polarizer alone. Alternatively, the polarizing plate may include a polarizer and a protective film formed on one or both surfaces of the polarizer. Alternatively, the polarizing plate may include a polarizer and a protective coating layer formed on one or both surfaces of the polarizer. As the polarizer, the protective film and the protective coating layer, a typical polarizer, a typical protective film, and a typical protective coating layer known in the art may be used. In addition, the polarizing plate may further include a retardation film, a compensation film such as a λ/2 film and a λ/4 film, and a retardation liquid coating layer. The touchscreen panel generates electrical signals through detection of variation in capacitance when a human body or a conductor, such as a stylus, touches the touchscreen panel, and the display unit may be driven by such electrical signals. The touchscreen panel is formed by patterning a flexible conductive conductor, and may include first sensor electrodes and second sensor electrodes each formed between the first sensor electrodes and intersecting the first sensor electrodes. The touchscreen panel may include a conductive material, such as metal nanowires, conductive polymers, and carbon nanotubes, without being limited thereto. The touchscreen panel may include a base layer and the patterned conductor. The base layer may be formed of an insulating synthetic resin including, for example, polyethylene terephthalate, polyimide, polycarbonate, polyacrylate, and the like, or may be a polarizer or a polarizer protective film in order to secure a thin thickness thereof. In an embodiment of the present invention, the optical film 93 may include a polarizing plate and a touchscreen panel formed on the polarizing plate. However, in the structure wherein the optical film 93 is a polarizing plate, the touchscreen panel may be directly formed on the display unit 91.

Next, the window film 95 will be described.

The window film 95 may be disposed as an outermost layer of the flexible display apparatus 100 to protect the flexible display apparatus. The window film 95 may include a flexible window film.

In an embodiment, the window film 95 may include a base layer and a window coating layer.

The base layer serves to support the window film 95 and may be an optically transparent optical film. The optical film may have a total light transmittance of 90% or more in the visible region, and may include a flexible film formed of at least one selected from among cellulose resins including triacetylcellulose, polyester resins, such as polyethylene terephthalate, polyethylene naphthalate, polybutylene terephthalate, and polybutylene naphthalate, polycarbonate resins, polyimide resins, polyamide resins, polystyrene resins, poly(meth)acrylate resins including poly(methyl methacrylate), and the like. The optical film may have a thickness of about 10 μm to about 100 μm, and, in one embodiment, about 20 μm to about 75 μm, and, in one embodiment, about 30 μm to about 50 μm. Within this range, the optical film may be used as the base layer of the window film 95.

The base layer may be a film laminate including the optical film. In an embodiment, the film laminate may be a three- or more layer film laminate including two or more optical films, in which at least two optical films are stacked one above another via an adhesive film. The adhesive film may be formed of the adhesive composition comprising a monomer mixture for the hydroxyl group-containing (meth) acrylic copolymer and the organic nanoparticles. The adhesive composition may further include at least one of the initiator, the crosslinking agent, the silane coupling agent, and the additive. The adhesive film may be the same as or different from the first adhesive film and the second adhesive film.

In an embodiment, the film laminate may be a three-layer film laminate in which a first optical film and a second optical film are stacked via the adhesive film. Each of the first optical film and the second optical film may include at least one of a polyethylene terephthalate resin, a polycarbonate resin, a polyimide resin, a poly(meth)acrylate resin, a cyclic-olefin polymer resin, an acrylic resin, and a polyamide resin. Each of the first optical film and the second optical film may have a thickness of about 10 μm to about 100 μm, and, in one embodiment, about 20 μm to about 75 μm, and, in one embodiment, about 30 μm to about 50 μm, and the adhesive film may have a thickness of about 10 μm to about 100 μm. Within this range, the film laminate can maximize or increase impact resistance while maintaining good folding properties. The first optical film and the second optical film may have the same or different thicknesses and may be formed of the same or different materials. The adhesive film may be the same as or different from the first adhesive film and the second adhesive film.

The window coating layer is formed on the base layer as the outermost layer of the flexible display apparatus and can become a flexible coating layer. For example, the window coating layer may include a coating layer formed of a siloxane resin.

In another embodiment, the window film 95 may include a base layer, a window coating layer formed on one side of the base layer, and a hardness enhancing coating layer formed on the other side of the base layer. The window film 95 may have a pencil hardness of about 6H or more, and, in one embodiment, about 6H to about 9H.

Hereinafter, the present invention will be described in more detail with reference to some examples. It should be understood that these examples are provided for illustration only and are not to be construed in any way as limiting the present invention.

Preparation of Adhesive Film

The adhesive film was prepared using the following components.

(A) Monomer for forming hydroxyl group-containing (meth)acrylic copolymer
 (a1) 2-ethylhexyl acrylate (EHA)
 (a2) 4-hydroxybutyl acrylate (HBA)
 (a3) 2-hydroxyethyl acrylate (HEA)
(B) Organic nanoparticles
Organic nanoparticles having a core-shell structure, an average particle diameter of 130 nm and an index of refraction of 1.48, and prepared by emulsion polymerization, in which the core is formed of polybutyl acrylate (PBA) and is present in an amount of 70 wt % in the organic nanoparticles, and the shell is formed of poly(methyl methacrylate) (PMMA) and is present in an amount of 30 wt % in the organic nanoparticles.

(C) Initiator (c1) Photopolymerization initiator: Irgacure 651 (2,2-dimethoxy-2-phenylacetophenone, BASF)

(c2) Photopolymerization initiator: Irgacure 184 (1-hydroxycyclohexyl phenyl ketone, BASF)

(D) Crosslinking agent: 1,6-hexanediol diacrylate

Preparative Example 1

A mixture was prepared by sufficiently mixing 100 parts by weight of a monomer mixture (A) comprising 65 wt % of 2-ethylhexylacrylate (a1) and 35 wt % of 4-hydroxybutyl acrylate (a2), 4 parts by weight of organic nanoparticles (B) and 0.005 parts by weight of a photopolymerization initiator (c1) in a glass container. After replacing dissolved oxygen in the glass container with nitrogen, the mixture was subjected to partial polymerization through irradiation with UV light using a low pressure lamp (BL Lamp, Sankyo Co., Ltd.), thereby preparing a mixture comprising a hydroxyl group-containing (meth)acrylic copolymer (prepolymer) and having a viscosity of about 2,000 cPs, the monomer and the organic nanoparticles. To the prepared mixture, an additional photopolymerization initiator (c2) was added in an amount of 0.3 parts by weight relative to 100 parts by weight of the monomer mixture (A), thereby preparing an adhesive composition.

The prepared adhesive composition was coated onto a polyester film (release film, polyethylene terephthalate film, thickness: 75 μm) to form an adhesive film having a thickness of 50 μm. With a 75 μm thick release film coated onto an upper side of the adhesive film, both sides of the adhesive film were irradiated with UV light using a low-pressure lamp (BL Lamp, Sankyo Co., Ltd.) for about 6 minutes, thereby obtaining a transparent adhesive sheet.

Preparative Examples 2 to 6

Transparent adhesive films were prepared by the same method as in Preparative Example 1 except that the amount of each component was changed as listed in Table 1. Each of the adhesive films prepared in Preparative Examples 1 to 6 was evaluated as to the following properties, and evaluation results are shown in Table 1.

Property Evaluation (1) Modulus: Viscoelasticity was measured at a shear rate of 1 rad/sec and a strain of 1% under auto-strain conditions using a dynamic viscoelasticity instrument ARES (MCR-501, Anton Paar Co., Ltd.). After removal of the release film, the 50 μm thick adhesive films were stacked to a thickness of 500 μm, followed by punching the stack structure using an 8 mm diameter punching machine, thereby preparing a specimen. Modulus was measured on the specimen while increasing the temperature from −60° C. to 90° C. at 5° C./min and storage modulus at each of −20° C., 25° C. and 80° C. was recorded.

(2) Peel strength: A PET film having a size of 150 mm×25 mm×75 μm (length×width×thickness) was subjected to corona treatment twice (total dose: 156) under corona discharge at a dose of 78 using a corona treatment device. The corona-treated surfaces of the PET films were laminated on both surfaces of an adhesive film having a size of 100 mm×25 mm×50 μm (length×width×thickness), thereby preparing a specimen, as shown in FIG. 2A. The specimen was subjected to autoclaving under conditions of about 3.5 bar and about 50° C. for about 1,000 seconds and secured to a TA.XT_Plus texture analyzer (Stable Micro System Co., Ltd.). Referring to FIG. 2B, with the PET film secured at one side thereof to the TA.XT_Plus Texture Analyzer, T-peel strength at 25° C. was measured by pulling the other side of the PET film at 50 mm/min.

(3) Haze: Haze was measured using a haze meter (NDH 5000, Nippon Denshoku Co., Ltd.). Haze was measured on a 50 μm thick adhesive film in accordance with ASTM (American Society for Testing and Measurement) D 1003-95 5 (Standard Test for Haze and Luminous Transmittance of Transparent Plastic).

TABLE 1

| | Preparative Example | | | | | |
|---|---|---|---|---|---|---|
| | 1 | 2 | 3 | 4 | 5 | 6 |
| EHA (wt %) | 65 | 83 | 83 | 83 | 65 | 83 |
| HBA (wt %) | 35 | 17 | 17 | 17 | — | — |
| HEA (wt %) | — | — | — | — | 35 | 17 |
| Initiator (c1) (parts by weight) | 0.005 | 0.005 | 0.005 | 0.005 | 0.005 | 0.005 |
| Initiator (c2) (parts by weight) | 0.3 | 0.3 | 0.3 | 0.3 | 0.3 | 0.3 |
| Organic nanoparticles (parts by weight) | 4 | 4 | 4 | 4 | 4 | 4 |
| Crosslinking agent (parts by weight) | 0 | 0 | 0.1 | 0.01 | 0 | 0 |
| Modulus (kPa) @−20° C. | 122 | 66.2 | 83 | 74 | 695 | 474 |
| Modulus (kPa) @25° C. | 40.1 | 25.6 | 36 | 29 | 38.2 | 40 |
| Modulus (kPa) @80° C. | 28.8 | 15.2 | 29 | 20 | 29 | 30 |
| Peel strength (gf/in) @25° C. | 1601 | 1547 | 1633 | 1136 | 1700 | 1901 |
| Haze (%) | 0.9 | 0.8 | 0.9 | 0.9 | 0.9 | 0.8 |

Example 1

Figure 3:
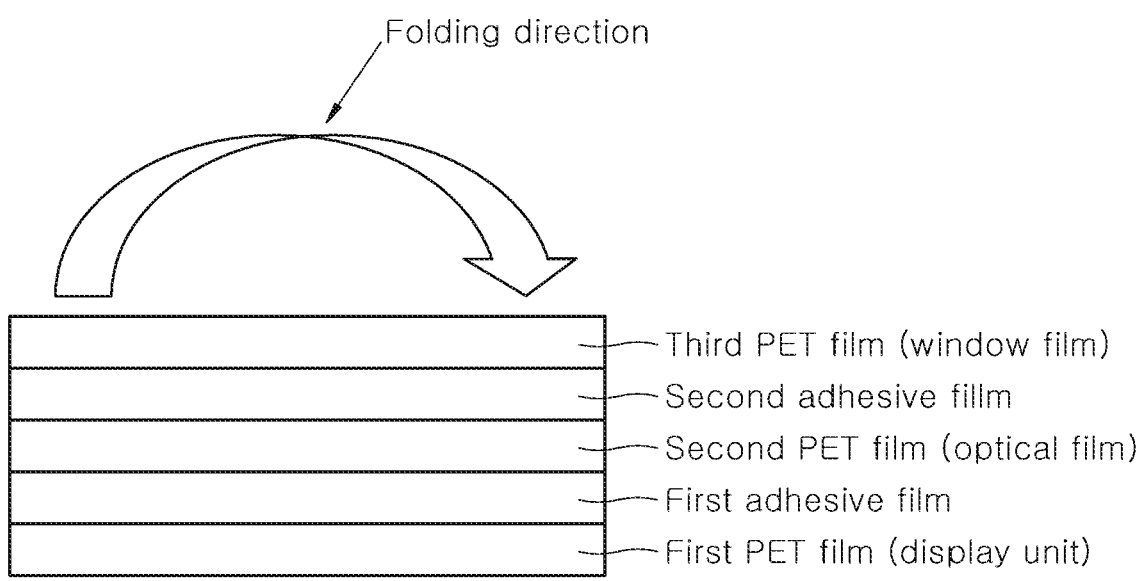
FIG. 3 is a sectional view of a specimen for a folding test.

A specimen corresponding to a flexible display apparatus was prepared by sequentially stacking a display unit, a first adhesive film, an optical film, a second adhesive film, and a window film, as shown in FIG. 3.

Display unit: First PET film (thickness: 100 μm, Cosmoshine TA015, Toyobo)

First adhesive film: Adhesive film (thickness: 50 μm) formed of adhesive composition of Preparative Example 2

Optical film (Polarizing plate, touchscreen panel): Second PET film (thickness: 50 μm)

Second adhesive film: Adhesive film (thickness: 50 μm) formed of adhesive composition of Preparative Example 1

Window film: Third PET film (thickness: 125 μm)

Example 2 and Comparative Examples 1 to 3

Specimens each corresponding to a flexible display apparatus were prepared in the same manner as in Example 1 except that the first adhesive film and the second adhesive film were changed as listed in Table 2.

The specimens prepared in Examples 1 and 2 and Comparative Examples 1 to 3 were evaluated as to the following properties and evaluation results are shown in Table 2.

(1) Bubble generation area ratio: Each of the specimens prepared in the Examples and Comparative Examples was cut to a size of 160 mm×100 mm, bent towards the window film so as to be placed between parallel frames having a gap of about 1 cm therebetween, and subjected to aging at 60° C. and 93% RH for about 24 hours, followed by analyzing an image, which was obtained by photographing a portion of the specimen suffering from bubble generation using an optical microscope (EX-51, Olympus Co., Ltd., magnification: 30×), using Mac-View software (Mountech Co., Ltd.) in order to measure a ratio (%) of the total area occupied by bubbles to the area of the specimen.

(2) Folding test (−20° C.): Each of the specimens prepared in the Examples and Comparative Example was cut to a size of 70 mm×140 mm (width×length) to prepare a specimen for folding testing, which in turn was subjected to autoclaving at 50° C. and 3.6 bar for 1,000 sec. As shown in FIG. 3, the specimen was secured to a folding test instrument (CFT series, COVOTEC Co., Ltd) in a state of being bent towards the window film such that the length of the specimen was halved, and was then subjected to 100,000 cycles of bending at −20° C. at a bending rate of 30 cycles per minute such that the bent portion of the specimen had a radius of curvature of 3 mm (one cycle refers to an operation of folding the adhesive film in half once and unfolding the adhesive film back). After 100,000 cycles of bending, a specimen suffering from delamination or bubble generation was rated as X and a specimen having no delamination or bubble generation was rated as ○.

TABLE 2

| Item | Properties | | Example 1 | Example 2 | Comparative Example 1 | Comparative Example 2 | Comparative Example 3 |
|---|---|---|---|---|---|---|---|
| | Adhesive film | | Preparative Example 1 | Preparative Example 3 | Preparative Example 2 | Preparative Example 2 | Preparative Example 6 |
| Second adhesive film | Modulus (kPa, G') | −20□ | 122 | 83 | 66.2 | 66.2 | 474 |
| | | 25□ | 40.1 | 36 | 25.6 | 25.6 | 40 |
| | | 80□ | 28.8 | 29 | 15.2 | 15.2 | 30 |
| | Peel strength (gf/in) | | 1601 | 1633 | 1547 | 1547 | 1901 |
| | Adhesive film | | Preparative Example 2 | Preparative Example 4 | Preparative Example 2 | Preparative Example 5 | Preparative Example 6 |
| First adhesive film | Modulus (kPa, G') | −20□ | 66.2 | 74 | 66.2 | 695 | 474 |
| | | 25□ | 25.6 | 29 | 25.6 | 38.2 | 40 |
| | | 80□ | 15.2 | 20 | 15.2 | 29 | 30 |
| | Peel strength (gf/in) | | 1547 | 1136 | 1547 | 1700 | 1901 |
| Comparison of modulus of first adhesive film with modulus of second adhesive film at −20° C. to 25° C. | | | Second adhesive film > First adhesive film | Second adhesive film > First adhesive film | Second adhesive film = First adhesive film | Second adhesive film < First adhesive film | Second adhesive film = First adhesive film |
| Bubble generation area ratio (%) | | | 0 | 0 | 8 | 50 | 0 |
| Folding test | | | ○ | ○ | ○ | X | X |

As shown in Table 2, the flexible display apparatuses of Examples 1 and 2 had a bubble generation area ratio of 0% and thus exhibited high reliability, and did not suffer from bubble generation, delamination or slight lifting and thus exhibited good foldability even after 100,000 cycles or more of folding. In addition, the specimen of Example 2, which was prepared using a display unit and a window film actually used in the art, could exhibit good reliability and foldability under high temperature/humidity conditions.

Conversely, the specimens of the Comparative Examples, in which the modulus of the second adhesive film was the same or less than that the first adhesive film, had high bubble generation area ratios and thus exhibited low reliability, or poor folding test results.

Although some embodiments have been described herein, it is to be understood that these embodiments are given by way of illustration only and that various modifications, changes, alterations, and equivalent embodiments can be made by those skilled in the art without departing from the spirit and scope of the invention as set forth by the accompanying claims and equivalents thereof.

What is claimed is:

1. A flexible display apparatus comprising:
   a display unit;
   a first adhesive film on the display unit;
   an optical film on the first adhesive film;
   a second adhesive film on the optical film; and
   a window film on the second adhesive film,
   wherein the second adhesive film has a higher modulus than the first adhesive film at −20° C. to 25° C.,
   wherein the first adhesive film has a modulus of about 150 kPa or less at −20° C.,
   wherein the second adhesive film has a modulus of about 25 kPa or less at 80° C., and
   wherein each of the first adhesive film and the second adhesive film is a cured product of an adhesive composition, the adhesive composition comprising organic nanoparticles and a monomer mixture forming a hydroxyl group-containing (meth)acrylic copolymer, the adhesive composition of the second adhesive film having a higher amount of a hydroxyl group-containing (meth)acrylate, a higher amount of an initiator, or a higher amount of a crosslinking agent than the adhesive composition of the first adhesive film.

2. The flexible display apparatus according to claim 1, wherein a modulus ratio of the modulus of the second adhesive film to the modulus of the first adhesive film at −20° C. to 25° C. is greater than about 1.0 to about 10.

3. The flexible display apparatus according to claim 1, wherein a modulus ratio of a modulus of the second adhesive film to a modulus of the first adhesive film at 80° C. is about 1.0 or greater.

4. The flexible display apparatus according to claim 1, wherein the optical film comprises at least one of a polarizing plate and a touchscreen panel.

5. The flexible display apparatus according to claim 1, wherein each of the first adhesive film and the second adhesive film has a peel strength of about 800 gf/in or greater at 25° C.

6. The flexible display apparatus according to claim 1, wherein the flexible display apparatus has a bubble generation area ratio of 5% or less.

7. The flexible display apparatus according to claim 1, wherein the organic nanoparticles have an average particle diameter of about 10 nm to about 400 nm.

8. The flexible display apparatus according to claim 1, wherein the organic nanoparticles have a core-shell structure, the core and the shell of the core-shell structure having glass transition temperatures satisfying Equation 1:

$$Tg(c) < Tg(s),\qquad \text{[Equation 1]}$$

where $Tg(c)$ is the glass transition temperature (unit: ° C.) of the core and $Tg(s)$ is the glass transition temperature (unit: ° C.) of the shell).

9. The flexible display apparatus according to claim 8, wherein the glass transition temperature of the core is about −150° C. to about 10° C., and the glass transition temperature of the shell is about 15° C. to about 150° C.

10. The flexible display apparatus according to claim 1, wherein the organic nanoparticles are present in an amount of about 0.5 parts by weight to about 15 parts by weight relative to 100 parts by weight of the monomer mixture forming the hydroxyl group-containing (meth)acrylic copolymer.

11. The flexible display apparatus according to claim 1, wherein a difference in index of refraction between the organic nanoparticles and the hydroxyl group-containing (meth)acrylic copolymer is about 0.05 or less.

12. The flexible display apparatus according to claim 1, wherein the monomer mixture comprises about 60 wt % to about 95 wt % of a comonomer and about 5 wt % to about 40 wt % of the hydroxyl group-containing (meth)acrylate.

13. The flexible display apparatus according to claim 12, wherein the comonomer comprises at least one of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and a silane group-containing monomer, a homopolymer of the comonomer having a glass transition temperature (Tg) of about −150° C. to about 0° C.

14. The flexible display apparatus according to claim 1, wherein the window film comprises a three-layer film laminate comprising a first optical film, a second optical film, and an adhesive film between the first optical film and the second optical film.

15. The flexible display apparatus according to claim 14, wherein each of the first optical film and the second optical film is formed of at least one of a polyester resin, a polycarbonate resin, a polyimide resin, a poly(meth)acrylate resin, a cyclic-olefin polymer resin, and an acrylic resin.

16. The flexible display apparatus according to claim 14, wherein each of the first optical film and the second optical film has a thickness of about 10 μm to about 100 μm, and the adhesive film has a thickness of about 10 μm to about 100 μm.

17. The flexible display apparatus according to claim 14, wherein the adhesive film is formed of an adhesive composition comprising a monomer mixture for a hydroxyl-group containing (meth)acrylic copolymer and organic nanoparticles.

* * * * *